United States Patent
Takada

(10) Patent No.: US 8,534,922 B2
(45) Date of Patent: Sep. 17, 2013

(54) WHEEL ROLLING BEARING UNIT

(75) Inventor: Yoshito Takada, Nara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 510 days.

(21) Appl. No.: 12/448,621

(22) PCT Filed: Dec. 27, 2007

(86) PCT No.: PCT/JP2007/075137
§ 371 (c)(1),
(2), (4) Date: Jun. 26, 2009

(87) PCT Pub. No.: WO2008/081875
PCT Pub. Date: Jul. 10, 2008

(65) Prior Publication Data
US 2010/0054644 A1    Mar. 4, 2010

(30) Foreign Application Priority Data
Dec. 28, 2006    (JP) .................................. 2006-355116

(51) Int. Cl.
*F16C 33/76*    (2006.01)

(52) U.S. Cl.
USPC .......................................... 384/489; 384/544

(58) Field of Classification Search
USPC ................... 384/489, 544; 301/105.1, 108.3; 220/796, 798, 801, 804, 806, 782; 138/89
See application file for complete search history.

(56) References Cited

U.S. PATENT DOCUMENTS

| | | | | |
|---|---|---|---|---|
| 3,635,369 A * | 1/1972 | Lasswell et al. | | 220/804 |
| 3,893,690 A * | 7/1975 | Yapp | | 301/108.3 |
| 5,195,807 A * | 3/1993 | Lederman | | 301/108.1 |
| 5,217,137 A * | 6/1993 | Andrews | | 220/366.1 |
| 2003/0173699 A1* | 9/2003 | McLean | | 264/154 |
| 2004/0170345 A1 | 9/2004 | Takada | | |
| 2007/0286536 A1 | 12/2007 | Kawamura et al. | | |

FOREIGN PATENT DOCUMENTS

| | | |
|---|---|---|
| FR | 2 114 413 A5 | 6/1972 |
| JP | 51-105965 | 8/1976 |
| JP | 63/176761 | 7/1988 |
| JP | 11-304827 | 11/1999 |

(Continued)

OTHER PUBLICATIONS

Extended European Search Report dated Oct. 31, 2012.

(Continued)

*Primary Examiner* — William C Joyce
(74) *Attorney, Agent, or Firm* — McGinn IP Law Group, PLLC

(57) ABSTRACT

A cover member includes a metallic cover main body having a lid portion and a cylindrical portion and an elastic covering material which covers outer circumferential surfaces of the lid portion and the cylindrical portion. In a state resulting before the cover member is fitted in a one end side opening of an outer ring of a rolling bearing, of the elastic covering material, an outside diameter dimension of a cylindrical portion elastic layer which covers the outer circumferential surface of the cylindrical portion is set to be larger than an inside diameter dimension of an inner circumferential surface of the one end side opening. In an attached state in which the cover member is fitted in the outer ring, the cylindrical portion elastic layer is elastically compressed to thereby be brought into close contact with the inner circumferential surface of the one end side opening of the outer ring.

19 Claims, 2 Drawing Sheets

(56) References Cited

FOREIGN PATENT DOCUMENTS

| | | |
|---|---|---|
| JP | 2004-52829 | 2/2004 |
| JP | 2004-198378 | 7/2004 |
| JP | 2004-297944 | 10/2005 |
| JP | 2005-282767 | 10/2005 |
| JP | 2006-064066 | 3/2006 |

OTHER PUBLICATIONS

Notification of Reason for Refusal dated Apr. 17, 2013, with English translation.

* cited by examiner

WHEEL ROLLING BEARING UNIT

TECHNICAL FIELD

The present invention relates to a wheel rolling bearing unit in which a rolling bearing is assembled to an outer circumference of a hub shaft of a hub wheel to which a wheel is to be attached.

BACKGROUND ART

Conventionally, in a wheel rolling bearing unit of this type, there is known a wheel rolling bearing unit in which a metallic cover member which is formed by pressing a low carbon steel sheet is fitted in a one end side opening of an outer ring of a rolling bearing so as to close the same opening in order to protect an interior of the rolling bearing which is assembled to an outer circumference of a hub shaft of a hub wheel from muddy water or dust.

In addition, the cover member has integrally a lid portion and a cylindrical portion which is caused to project in an axial direction from an outer circumferential edge of the lid portion, and an outside diameter of the cylindrical portion is set in such a manner as to be slightly larger than an inside diameter dimension of the one end side opening of the outer ring. In addition, it has been general practice that the cover member is fitted (press fitted) in the one end side opening of the outer ring at the cylindrical portion thereof for attachment.

In addition, in wheel rolling bearing units, as a wheel rolling bearing unit in which a one end side opening of an outer ring thereof is closed by a cover member, a wheel rolling bearing unit is disclosed in, for example, JP63-A-176761.

DISCLOSURE OF THE INVENTION

Problem that the Invention is to Solve

Incidentally, when it is used for a long period of time with muddy water or snow-melting agent kept adhering thereto, the metallic cover member starts to rust, and in the event that the metallic cover rusts largely, it is foreseen that a gap will be generated in the fitting portion between the one end side opening of the outer ring and the outer circumferential surface of the cylindrical portion of the cover member and that muddy water, dust or the like will penetrate into the rolling bearing unit from the gap.

Because of this, an outer surface of the cover member is painted or is made of a stainless steel sheet which is hard to rust. However, in the case of painting, since there is a fear that in case a small stone or the like strikes to damage the cover, rust starts to propagate from the damaged portion, the thickness of the coat needs to be thick, and this increases the painting costs. In addition, with the stainless steel sheet, in order to obtain a desired dimension accuracy, the stainless sheet needs to be pressed step by step a plurality of times, and this increases the manufacturing costs.

In view of the problems described above, an object of the invention is to provide a wheel rolling bearing unit which can prevent the generation of a gap in a fitting portion between an inner circumferential surface of a one end side opening of an outer ring and a cylindrical portion of a cover member.

Means for Solving the Problem

To achieve the object, a wheel rolling bearing unit according to a first aspect of the invention comprises:

a rolling bearing which is attached to an outer circumference of a hub shaft of a hub wheel to which a wheel is to be attached, and includes an outer ring; and a cover member fitted in one end side opening of the outer ring of the rolling bearing, wherein the cover member includes a metallic cover main body having integrally a lid portion and a cylindrical portion which projects in an axial direction from an outer circumferential edge of the lid portion and an elastic covering material having elasticity which covers outer circumferential surfaces of the lid portion and the cylindrical portion of the cover main body, wherein, in a state resulting before the cover member is fitted in the one end side opening of the outer ring, an outside diameter dimension of a cylindrical portion elastic layer of the elastic covering material, which covers an outer circumferential surface of the cylindrical portion of the cover main body, is set to be larger than an inside diameter dimension of an inner circumferential surface of the one end side opening of the outer ring, and wherein, in an attached state in which the cover member is fitted in the inner circumferential surface of the one end side opening of the outer ring, the cylindrical portion elastic layer is elastically compressed to be brought into close contact with the inner circumferential surface of the one end side opening of the outer ring.

According to the configuration described above, the generation of rust in the cover main body is prevented by the lid portion of the cover main body and the outer surface of the cylindrical portion are covered by the elastic covering material.

In addition, when attaching the cover member to the inner circumferential surface of the one end side opening of the outer ring, the cover member is so attached by the cover member being fitted therein at the cylindrical portion thereof.

In this attached state, the cylindrical portion elastic layer is elastically compressed by such an extent that the outside diameter dimension of the cylindrical portion elastic layer of the elastic covering material is set in such a manner as to be larger than the inside diameter dimension of the inner circumferential surface of the one end side opening of the outer ring, and the cylindrical portion elastic layer is brought into close contact with the inner circumferential surface of the one end side opening of the outer ring. By this, the generation of a gap in the fitting portion between the inner circumferential surface of the one end side opening of the outer ring and the cylindrical portion of the cover member is prevented well, superior waterproofness (sealing properties) being thereby provided.

Further, since the whole outer surface of the cover main body is covered by the elastic covering material, even in the event that a small stone strikes the cover main body, the damage to the cover main body due to the impact produced by the small stone can be prevented.

According to a second aspect of the invention, in the wheel rolling bearing unit of the first aspect of the invention, an annular recess portion is formed on the outer circumferential surface of the cylindrical portion, and the cylindrical elastic layer is filled and held in the annular recess portion and makes a filled portion of the annular recess portion into a thick elastically deformable portion.

According to the configuration described above, since the cylindrical elastic layer makes the filled portion of the annular recess portion on the outer circumferential surface of the cylindrical portion of the cover main body into the thick elastically deformable portion, the elastic compression amount can be increased in the thick elastically deformable portion. In addition, not only can the variation in manufacturing accuracy of the cover member be absorbed by virtue of the elastic compression of the elastically deformable portion, but also the cover member can be brought into close contact with the inner circumferential surface of the one end side opening of the outer ring in a more ensured fashion, thereby making it possible to realize an increase in waterproofness.

According to a third aspect of the invention, in the wheel rolling bearing unit of the first and second aspects of the invention, a chamfered portion is formed on an inner circumferential edge of the one end side opening of the outer ring, and a part of the cylindrical portion elastic layer is brought into elastic close contact with the chamfered portion.

According to the configuration described above, by part of the cylindrical portion elastic layer being brought into elastic close contact with the chamfered portion along the inner circumferential edge of the opening of the outer ring, the waterproofness can be increased further.

BEST MODE FOR CARRYING OUT THE INVENTION

Next, a best mode for carrying out the invention will be described based on an embodiment.

Embodiment

Embodiment 1 of the invention will be described based on the drawings.

Figure 1:
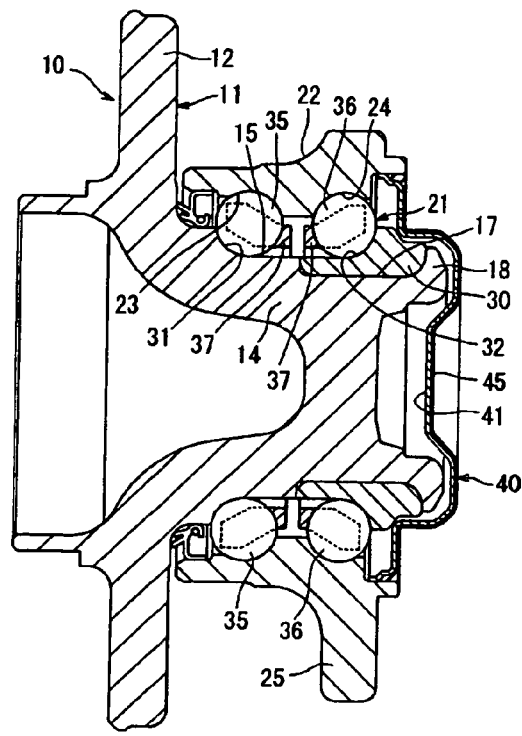
FIG. 1 is a sectional view showing a wheel rolling bearing unit according to Embodiment 1 of the invention.
Figure 2:
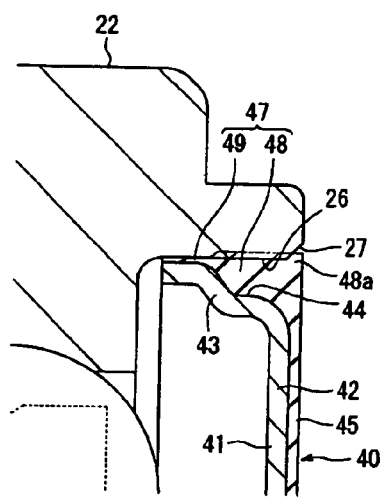
FIG. 2 is a sectional view showing in an enlarged fashion a state in which a cylindrical portion of a cover member is fitted in an inner circumferential surface of a one end side opening of an outer ring of the same wheel rolling bearing unit for attachment thereto.
Figure 3:
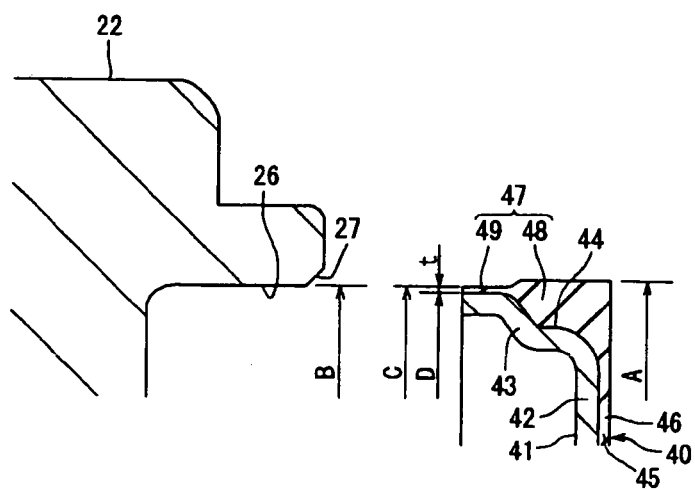
FIG. 3 is an explanatory diagram showing a relationship between the inner circumferential surface of the one end side opening of the outer ring of the same wheel rolling bearing unit and a cylindrical portion elastic layer of an elastic covering material of the cover member.
10 wheel rolling bearing unit (wheel hub unit); 11 hub wheel; 12 flange; 14 hub shaft; 21 angular rolling bearing (rolling bearing); 22 outer ring; 26 inner circumferential surface; 40 cover member; 41 cover main body; 42 lid portion; 43 cylindrical portion; 45 elastic covering material; 46 lid portion elastic layer; 47 cylindrical portion elastic layer; 48 elastically deformable portion.

FIG. 1 is a sectional view showing a wheel rolling bearing unit according to Embodiment 1 of the invention. FIG. 2 is a sectional view showing in an enlarged fashion a state in which a cylindrical portion of a cover member is fitted in an inner circumferential surface of a one end side opening of an outer ring for attachment thereto. FIG. 3 is an explanatory diagram showing a relationship between a the inner circumferential surface of the one end side opening of the outer ring and a cylindrical portion elastic layer of an elastic covering material of the cover member before the attachment of the cover member to the inner circumferential surface.

As is shown in FIG. 1, a wheel rolling bearing unit (a wheel hub unit) 10 has integrally a hub wheel 11 and a double-raw angular ball bearing 21 as a rolling bearing to thereby be made into a unit.

As is shown in FIG. 1, the hub wheel 11 has integrally a hub shaft 14 and a flange 12 which is formed on the hub shaft 14 in a position lying closer to one end thereof, and a wheel (a driven wheel) is made to be attached to the flange 12 via a brake rotor interposed therebetween by a plurality of bolts.

The double-raw angular ball bearing 21, which includes an outer ring 22, an inner ring 30, pluralities of balls 35, 36 as rolling elements and cages 37, 38, is assembled to an outer circumference of the hub shaft 14.

In Embodiment 1, the hub shaft 14 has integrally a large diameter shaft portion 15 which is formed on a flange 12 side thereof and a small diameter shaft portion 17 which is made appropriately smaller in diameter than the large diameter shaft portion 15 and is formed consecutively to the large diameter portion 15 via a rising surface. In addition, a first inner ring side raceway surface 31, which corresponds to a first outer ring side raceway surface 23 of the outer ring is formed on an outer circumferential surface of the large diameter shaft portion 15.

Further, the inner ring 30, on whose outer circumferential surface a second inner ring side raceway surface 32 which corresponds to a second outer ring side raceway surface 24 of the outer ring 22 is formed, is fitted on an outer circumferential surface of the small diameter shaft portion 17 of the hub shaft 14, and thereafter, a distal end portion of the small diameter shaft portion 17 is crimped so as to form a crimped portion 18, whereby the inner ring 30 is fixed in place between the rising surface and the crimped portion 18.

In addition, the pluralities of balls 35, 36 and the cages 37, 38 which hold the pluralities of balls 35, 36 respectively are assembled between both the first and second raceway surfaces 23, 24 of the outer ring 22 and both the first and second raceway surfaces 31, 32 of the hub shaft 14.

In addition, an attachment flange 25, which is adapted to be attached to a body side member (a knuckle or a carrier) supported on a suspension unit (not shown) of the vehicle with bolts, is formed integrally on an outer circumferential surface of the outer ring 22.

In order to protect an interior of the angular ball bearing 21 as the rolling bearing which is assembled to the outer circumference of the hub shaft 14 of the hub wheel 11 from muddy water or dust, as is shown in FIGS. 1 and 2, a cover member 40 is fitted in a one end side opening of the outer ring 22 so as to close the same opening.

The cover member 40 includes a metallic cover main body 41 and an elastic covering material 45 and is formed into a capped cylindrical shape.

As is shown in FIGS. 2 and 3, the cover main body 41 is formed by pressing a sheet metal such a low carbon steel sheet and includes integrally a lid portion 41 and a cylindrical portion 43 which is caused to project in an axial direction from an outer circumferential edge of the lid portion 42.

The elastic covering member 45 is made of an elastic material such as a non rigid plastic, a rubber or the like and has a lid portion elastic layer 46 and a cylindrical portion elastic layer 47 which cover whole outer surfaces of the lid portion 42 and the cylindrical portion 43, respectively, the lid portion elastic layer 46 and the cylindrical portion elastic layer 47 being formed consecutively and integrally.

As is shown in FIG. 3, in a state resulting before the cover member 40 is fitted into an inner circumferential surface 26 of the one end side opening of the outer ring, an outside diameter dimension (a maximum outside diameter dimension) A of the cylindrical portion elastic layer 47 of the elastic covering material 45 is set in such a manner as to be larger than an inside diameter dimension B of the inner circumferential surface 26 of the outer ring 22.

In addition, as is shown in FIGS. 1 and 2, in an attached state in which the cover member 40 is fitted in the inner circumferential surface 26 of the one end side opening of the outer ring 22, the cylindrical portion elastic layer 47 is made to be elastically compressed so as to be brought into close contact with the inner circumferential surface 26 of the one end side opening of the outer ring 22.

Additionally, in Embodiment 1, as is shown in FIGS. 2 and 3, an annular recess portion 44 is formed on the outer circumferential surface of the cylindrical portion 43 of the cover main body 41, and the cylindrical portion elastic layer 47 is filled and held in the annular recess portion 44 and makes the filled portion of the annular recess portion 44 into a thick elastically deformable portion 48.

Namely, in Embodiment 1, an outer circumferential surface of the elastically deformable portion 48 of the cylindrical elastic layer 47 is set to the outside diameter dimension A which makes the maximum outside diameter dimension.

In addition, as is shown in FIG. 3, a distal end portion 49 of the cylindrical portion elastic layer 47 has a thin shape with a thickness dimension t and is integrally joined to an outer circumferential surface of a distal end side of the cylindrical portion 43 of the cover main body 41. Additionally, an outside diameter dimension C of the distal end portion 49 which is a sum of an outside diameter dimension D of the cylindrical portion 43 of the cover main body 41 and the thickness dimension t of the distal end portion 49 is set in such a manner as to be smaller than the outside diameter dimension A of the elastically deformable portion 48 and be substantially the same as the inside diameter dimension B of the inner circumferential surface 26 of the outer ring 22.

In addition, in Embodiment 1, as is shown in FIGS. 2 and 3, a chamfered portion 27 with a predetermined chamfered angle is formed on an inner circumferential edge of the one end side opening of the outer ring 22, and in the attached state shown in FIG. 2, part 48a of the elastically deformable portion 48 of the cylindrical portion elastic layer 47 is made to be brought into elastic close contact with the chamfered portion 27.

The wheel rolling bearing unit according to Embodiment 1 is configured as has been described heretofore.

Consequently, as is shown in FIG. 1, by the outer surfaces of the lid portion 42 and the cylindrical portion 43 of the metallic cover main body 41 being covered by the elastic covering material 45, the generation of rust in the cover main body 41 is prevented.

In addition, when the cover member 40 is attached to the inner circumferential surface 26 of the one end side opening of the outer ring 22, the cover member is so attached by the cover member 40 being fitted in the inner circumferential surface 26 at the cylindrical portion 43 thereof.

In this attached state, the cylindrical portion elastic layer 47 is elastically compressed by such an extent that the outside diameter dimension A of the cylindrical portion elastic layer 47 of the elastic covering material 45 is set in such a manner as to be larger than the inside diameter dimension B of the inner circumferential surface 26 of the one end side opening of the outer ring 22, to thereby be brought into close contact with the inner circumferential surface 26 of the one end side opening of the outer ring 26. By this, the generation of a gap in the fitting portion between the inner circumferential surface 26 of the one end side opening of the outer ring 22 and the cylindrical portion 43 of the cover member 40 can be prevented well, superior waterproofness being thereby provided.

In addition, in Embodiment 1, the cylindrical elastic layer 47 makes the filled portion at the annular recess portion 44 on the outer circumferential surface of the cylindrical portion 43 of the cover main body 41 into the thick elastically deformable portion 48. Because of this, the elastic compression amount can be increased at the thick elastically deformable portion 48. Additionally, not only can the variation in manufacturing accuracy of the cover member 40 be absorbed by virtue of the elastic compression of the elastically deformable portion 48, but also the cover member 40 can be brought into close contact with the inner circumferential surface 26 of the one end side opening of the outer ring 22 in a more ensured fashion, thereby making it possible to realize an increase in waterproofness.

In addition, in Embodiment 1, as is shown in FIG. 2, by the part 48 of the elastically deformable portion 48 of the cylindrical portion elastic layer 47 being brought into elastic close contact with the chamfered portion 27 along the inner circumferential edge of the opening of the outer ring 22, the waterproofness can be increased further.

Note that the invention is not limited to Embodiment 1 that has been described heretofore.

For example, in Embodiment 1 that has been described above, while the wheel rolling bearing unit (the wheel hub unit) 10 is described as being applied to the driven wheel, the invention can also be carried out in a wheel rolling bearing unit (a wheel hub unit) in which a hub shaft of a hub wheel is formed into a cylindrical shaft shape and an axle (a drive axle) is fitted in an inner hole in the hub shaft for transmission of torque.

In addition, in Embodiment 1 above, while the case is illustrated in which the double-raw angular ball baring is adopted, the invention can also be carried out even when a double-raw tapered roller bearing is used.

The invention claimed is:

1. A wheel rolling bearing unit comprising:
   a rolling bearing which is attached to an outer circumference of a hub shaft of a hub wheel to which a wheel is to be attached, and includes an outer ring; and
   a cover member fitted in one end side opening of the outer ring of the rolling bearing,
   wherein the cover member includes a metallic cover main body including integrally a lid portion and a cylindrical portion which projects in an axial direction from an outer circumferential edge of the lid portion and an elastic covering material having elasticity which covers at least one of outer circumferential surfaces of the lid portion and the cylindrical portion of the cover main body,
   wherein, in a state resulting before the cover member is fitted in the one end side opening of the outer ring, an outside diameter dimension of a cylindrical portion elastic layer of the elastic covering material, which covers an outer circumferential surface of the cylindrical portion of the cover main body, is set to be larger than an inside diameter dimension of an inner circumferential surface of the one end side opening of the outer ring,
   wherein, in an attached state in which the cover member is fitted in the inner circumferential surface of the one end side opening of the outer ring, the cylindrical portion elastic layer is elastically compressed to be brought into close contact with the inner circumferential surface of the one end side opening of the outer ring,
   wherein the cylindrical portion of the cover member includes:
      an annular recess portion formed on the outer circumferential surface of the cylindrical portion so as to extend in an axial direction from the outer circumferential edge of the lid portion and face an inner side of the wheel rolling bearing unit;

a step portion formed on a side of the annular recess portion opposite the lid portion; and an outer cylindrical portion extending from the step portion in the axial direction away from the lid portion to an distal end of the cylindrical portion opposite the lid portion, wherein a minimum outer circumferential diameter of the cylindrical portion extending from the step portion to the distal end of the of the cylindrical portion has a diameter greater than a maximum outer circumferential diameter of the cylindrical portion extending from the step portion to the lid portion, wherein the cylindrical portion elastic layer is filled and held in the annular recess portion and makes a filled portion of the annular recess portion into a thick elastically deformable portion, and wherein the elastic layer is disposed on a portion of the outer cylindrical portion.

2. The wheel rolling bearing unit according to claim 1, wherein a chamfered portion is formed on an inner circumferential edge of the one end side opening of the outer ring, and wherein a part of the cylindrical portion elastic layer is brought into elastic close contact with the chamfered portion.

3. The wheel rolling bearing unit according to claim 2, wherein the part of the cylindrical portion elastic layer brought into elastic close contact with the chamfered portion comprises a shape complementary to a shape of the chamfered portion.

4. The wheel rolling bearing unit according to claim 2, wherein, in the state resulting before the cover member is fitted in the one end side opening of the outer ring, the part of the cylindrical portion elastic layer brought into elastic close contact with the chamfered portion comprises a shape complementary to a shape of the chamfered portion.

5. The wheel rolling bearing unit according to claim 1, wherein a portion of the elastic covering material is disposed radially inward of a radially innermost portion of the cylindrical portion.

6. The wheel rolling bearing unit according to claim 1, wherein a portion of the elastic covering material disposed on the cylindrical portion is disposed radially outward of a portion of the elastic covering material disposed on the lid portion.

7. The wheel rolling bearing unit according to claim 1, wherein the lid portion is disposed radially inward of the cylindrical portion.

8. The wheel rolling bearing unit according to claim 1, wherein the lid portion is disposed axially inward of the cylindrical portion.

9. The wheel rolling bearing unit according to claim 1, wherein a portion of the elastic covering material is disposed on a radially innermost portion of the lid.

10. The wheel rolling bearing unit according to claim 1, wherein a distance between a portion of the lid portion and the outer ring of the rolling bearing is greater than a distance between a portion of the cylindrical portion and the outer ring of the rolling bearing.

11. The wheel rolling bearing unit according to claim 1, wherein the annular recess portion is disposed between a remainder of the cylindrical portion and the lid portion.

12. The wheel rolling bearing unit according to claim 1, wherein the elastic covering material is disposed so as to cover a portion of the lid portion disposed axially furthest from the outer ring.

13. The wheel rolling bearing unit according to claim 1, wherein a portion of the elastic covering material is disposed radially outward of a remainder of the cover member.

14. The wheel rolling bearing unit according to claim 1, wherein the annular recess portion is formed on a portion the cylindrical portion adjacent to the lid portion.

15. The wheel rolling bearing unit according to claim 1, wherein the cylindrical portion projects in an axial direction from a radially outermost circumferential edge of the lid portion.

16. The wheel rolling bearing unit according to claim 1, wherein an inner radius of the elastic member decreases as the elastic member extends in the axial direction toward the lid portion.

17. The wheel rolling bearing unit according to claim 1, wherein the elastic covering material is disposed so as to cover an end face of the lid portion facing away from the one end side opening of the outer ring.

18. The wheel rolling bearing unit according to claim 1, wherein a portion of the cylindrical portion disposed furthest, in the axial direction, from the lid portion comprises a radius greater than a radius of a remainder of the cover member.

19. The wheel rolling bearing unit according to claim 1, wherein the annular recess portion comprises a portion of the cylindrical portion closest to the lid portion.

* * * * *